United States Patent
Sethi et al.

(10) Patent No.: US 7,547,430 B2
(45) Date of Patent: Jun. 16, 2009

(54) AUTO-OXIDATION PRODUCTION OF HYDROGEN PEROXIDE VIA HYDROGENATION IN A MICROREACTOR

(75) Inventors: Dalbir S. Sethi, Cranbury, NJ (US); Emmanuel A. Dada, Bensalem, PA (US); Kevin Hammack, League City, TX (US); Xinliang Zhou, Sugar Land, TX (US)

(73) Assignee: FMC Corporation, Philadelphia, PA (US)

( * ) Notice: Subject to any disclaimer, the term of this patent is extended or adjusted under 35 U.S.C. 154(b) by 345 days.

(21) Appl. No.: 11/512,569

(22) Filed: Aug. 30, 2006

(65) Prior Publication Data

US 2008/0181842 A1 Jul. 31, 2008

Related U.S. Application Data

(60) Provisional application No. 60/713,171, filed on Aug. 31, 2005.

(51) Int. Cl.
C01B 15/01 (2006.01)
(52) U.S. Cl. .................................. 423/584; 423/588
(58) Field of Classification Search ................ 423/584; 500/250
See application file for complete search history.

(56) References Cited

U.S. PATENT DOCUMENTS

| | | | |
|---|---|---|---|
| 2,035,101 A | 3/1936 | Soule | |
| RE20,769 E | 6/1938 | Soule | |
| 2,158,525 A | 5/1939 | Riedl et al. | |
| 2,215,883 A | 9/1940 | Riedl et al. | |
| 2,657,980 A | 11/1953 | Sprauer | |
| 2,862,794 A | 12/1958 | Dufraisse et al. | |
| 2,886,416 A | 5/1959 | Cox et al. | |
| 3,004,831 A | 10/1961 | Hungerford et al. | |
| 3,009,782 A | 11/1961 | Porter | |
| 3,073,680 A | 1/1963 | Jenney et al. | |
| 3,423,176 A | 1/1969 | Kabisch et al. | |
| 3,565,581 A | 2/1971 | Lee | |
| 3,880,596 A | 4/1975 | Liebert et al. | |
| 4,428,922 A | 1/1984 | Hopkins | |
| 4,552,748 A | 11/1985 | Berglin et al. | |
| 4,576,687 A | 3/1986 | Hertl et al. | |
| 5,063,043 A | 11/1991 | Bengtsson | |
| 5,196,179 A | 3/1993 | Turunen | |
| 5,534,328 A | 7/1996 | Ashmead et al. | |
| 5,637,286 A | 6/1997 | Turunen | |
| 5,690,763 A | 11/1997 | Ashmead et al. | |
| 5,985,235 A | 11/1999 | Nystrom et al. | |
| 6,126,914 A | 10/2000 | Ogasawara et al. | |
| 6,207,128 B1 | 3/2001 | Sellin et al. | |
| 6,352,577 B1 | 3/2002 | Martin et al. | |
| 6,355,815 B1 | 3/2002 | Glenneberg et al. | |
| 6,375,921 B1 | 4/2002 | Eickhoff et al. | |
| 6,426,057 B1 | 7/2002 | Maurer | |
| 6,533,840 B2 | 3/2003 | Martin et al. | |
| 6,695,044 B1 | 2/2004 | Symonds | |
| 6,736,201 B2 | 5/2004 | Watton et al. | |
| 6,861,042 B2 | 3/2005 | Korl et al. | |
| 6,968,892 B1 | 11/2005 | Symonds | |
| 6,984,363 B2 | 1/2006 | Tonkovich et al. | |
| 6,988,535 B2 | 1/2006 | Upadhya et al. | |
| 6,994,829 B2 | 2/2006 | Whyatt et al. | |
| 7,029,647 B2 | 4/2006 | Tonkovich et al. | |
| 7,442,360 B2 | 10/2008 | Tonkovich et al. | |
| 2002/0141935 A1 | 10/2002 | Haas et al. | |
| 2003/0152488 A1 | 8/2003 | Tonkovich et al. | |
| 2003/0219903 A1 | 11/2003 | Wang et al. | |
| 2004/0228781 A1 | 11/2004 | Tonkovich et al. | |
| 2005/0133457 A1 | 6/2005 | Tonkovich et al. | |
| 2005/0244304 A1 | 11/2005 | Tonkovich et al. | |
| 2005/0265915 A1 | 12/2005 | Tonkovich et al. | |
| 2006/0046113 A1 | 3/2006 | Wang et al. | |
| 2006/0073080 A1 | 4/2006 | Tonkovich et al. | |
| 2006/0102519 A1 | 5/2006 | Tonkovich et al. | |

FOREIGN PATENT DOCUMENTS

| | | |
|---|---|---|
| EP | 0384905 A1 | 8/1990 |
| GB | 718307 A | 11/1954 |
| WO | 93-02960 A1 | 2/1993 |
| WO | 02-42704 A1 | 5/2002 |

OTHER PUBLICATIONS

Schumb et al, Hydrogen Peroxide, Reinhold Publishing, NY, 1955, pp. 77-82.
Kirk-Othmer Encyclopedia of Science & Technology, Hydrogen Peroxide, Wiley, NY, 3rd ed, vol. 13, pp. 15 22-23 33.
Ehrfeld et al, Microreactors, Wiley-VCH, Weinheim (Germany), 2003, pp. vi-xi, 1-12 229-243 255-256 277.
Ulmann's Encyclopedia of Industrial Chemistry, Hydrogen Peroxide, VCH, 5th ed, 1989, vol. A13 1991 pp. 443-444 457 464-465.
Kapteijn et al, "Monoliths in multiphase catalytic processes", Cattech 1999 vol. 3 No. 1 pp. 24-41.
Hawley Condensed Chemical Dictionary, 12th edition, Von Nostrand Reinhold, New York, 1993, p. 106.
Kirk Othmer Encyclopedia of Chemical Technology, "Hydrogen Peroxide", Wiley, 2001, vol. 13, pp. 1-58.
Edvinsson Albers et al. "Development of a monolith-based process for H2O2 production: from idea to large-scale implementation," Catalysis Today, vol. 69, 2001, pp. 247-252.

Primary Examiner—Melvin C Mayes
Assistant Examiner—Bijay Saha

(57) ABSTRACT

Hydrogen peroxide is prepared by an auto-oxidation method via hydrogenation in a microreactor. A working solution containing a reactive carrier compound is hydrogenated with hydrogen in a microreactor and is subsequently auto-oxidized to produce hydrogen peroxide.

20 Claims, No Drawings

AUTO-OXIDATION PRODUCTION OF HYDROGEN PEROXIDE VIA HYDROGENATION IN A MICROREACTOR

This application claims the benefit of U.S. Provisional Application No. 60/713,171, filed Aug. 31, 2005.

FIELD OF THE INVENTION

The present invention relates to an improved method for producing hydrogen peroxide. More particularly, the invention relates to a hydrogen peroxide method in which a microreactor is employed in the hydrogenation step of an auto-oxidation process.

BACKGROUND OF THE INVENTION

Hydrogen peroxide ($H_2O_2$) is a versatile commodity chemical with diverse applications. Hydrogen peroxide applications take advantage of its strong oxidizing agent properties and include pulp/paper bleaching, waste water treatment, chemical synthesis, textile bleaching, metals processing, microelectronics production, food packaging, health care and cosmetics applications. The annual U.S. production of $H_2O_2$ is 1.7 billion pounds, which represents roughly 30% of the total world output of 5.9 billion pounds per year. The worldwide market for hydrogen peroxide is expected to grow steadily at about 3% annually.

Various chemical processes may be employed to manufacture hydrogen peroxide on a commercial scale. One major class of hydrogen peroxide manufacture comprises the auto-oxidation (AO)(also called autoxidation) of a "working compound" or "working reactant" or "reactive compound", to yield hydrogen peroxide. Commercial AO manufacture of hydrogen peroxide has utilized working compounds in both cyclic and non-cyclic processes.

The cyclic AO processes typically involve hydrogenation (reduction) of a working compound and then auto-oxidation of the hydrogenated working compound to produce hydrogen peroxide. Most current large-scale hydrogen peroxide manufacturing processes are based on an anthraquinone AO process, in which hydrogen peroxide is formed by a cyclic reduction and subsequent auto-oxidation of anthraquinone derivatives. The anthraquinone auto-oxidation process for the manufacture of hydrogen peroxide is well known, being disclosed in the 1930s by Riedl and Pfleiderer, e.g., in U.S. Pat. No. 2,158,525 and No. 2,215,883, and is described in the Kirk-Othmer *Encyclopedia of Chemical Technology*, 3rd. ed., Volume 13, Wiley, New York, 1981, pp. 15-22.

In addition to the anthraquinones, examples of other working compounds feasible for use in the cyclic auto-oxidation manufacture of hydrogen peroxide include azobenzene and phenazine; see, e.g., Kirk-Othmer *Encyclopedia of Chemical Technology*, 3rd. ed., Volume 13, Wiley, New York, 1981, pp. 15 & 22.

In commercial AO hydrogen peroxide processes, the anthraquinone derivatives (i.e., the working compounds) are usually alkyl anthraquinones and/or alkyl tetrahydroanthraquinones, and these are used as the working compound(s) in a solvent-containing working solution. The anthraquinone derivatives are dissolved in an inert solvent system. This mixture of working compounds and solvent(s) is called the working solution and is the cycling fluid of the AO process. The solvent components are normally selected based on their ability to dissolve anthraquinones and anthrahydroquinones, but other important solvent criteria are low vapor pressure, relatively high flash point, low water solubility and favorable water extraction characteristics.

Non-cyclic AO hydrogen peroxide processes typically involve the auto-oxidation of a working compound, without an initial reduction of hydrogenation step, as in the auto-oxidation of isopropanol or other primary or secondary alcohol to an aldehyde or ketone, to yield hydrogen peroxide.

Hydrogenation (reduction) of the anthraquinone-containing working solution is carried out by contact of the latter with a hydrogen-containing gas in the presence of a catalyst in a large scale reactor at suitable conditions of temperature and pressure to produce anthrahydroquinones. Once the hydrogenation reaction has reached the desired degree of completion, the hydrogenated working solution is removed from the hydrogenation reactor and is then oxidized by contact with an oxygen-containing gas, usually air. The oxidation step converts the anthrahydroquinones back to anthraquinones and simultaneously forms $H_2O_2$ which normally remains dissolved in the working solution.

The remaining steps in conventional AO processes are physical operations. The $H_2O_2$ produced in the working solution during the oxidation step is separated from the working solution in a water extraction step. The working solution from which $H_2O_2$ has been extracted is returned to the reduction step. Thus, the hydrogenation-oxidation-extraction cycle is carried out in a continuous loop, i.e., as a cyclic operation. The $H_2O_2$ leaving the extraction step is typically purified and concentrated. An overview of the anthraquinone AO process for the production of hydrogen peroxide is given in Ullman's *Encyclopedia of Industrial Chemistry*, $5^{th}$ Edition, Volume A13, pages 447-456.

The productivity and selectivity of the hydrogenation reaction are critical to the economics of the AO process. Further, hydrogenation catalyst life and catalyst attrition have strong influences on the ease of operation, safety and economics of the AO process. Additionally, the auxiliary catalyst separation equipment required downstream of the hydrogenation reaction can be costly depending upon which type of hydrogenation reactor is chosen.

Conventional catalytic hydrogenation reactors give rise to undesirable hydrogenated byproduct compounds such as oxanthrones and anthrones. These compounds ultimately degrade into reactants no longer capable of producing hydrogen peroxide. The rate of generation of these parasitic byproducts has a strong influence on the sustained capacity and operating costs of a conventional AO process.

The hydrogenation reaction in traditional cyclic AO hydrogen peroxide processes is conventionally carried out in a large scale fluid-bed or fixed-bed reactor. The fluid-bed reactor is also commonly known as the suspension catalyst reactor. The fixed-bed reactor is used in a variety of different types including trickle-bed reactors, dispersed- and foam-flow reactors, and the monolithic catalyst structure reactor to name just a few. Each type has its advantages and disadvantages.

Fluid-bed hydrogenation reactors achieve good contact among the three phases and, thus, obtain high activity and selectivity. However, costly and technically elaborate solids removal devices (e.g., filters, cyclones, etc.) are required to prevent the catalyst from entering the oxidation stage of the AO process where the catalyst can lead to unsafe decomposition of hydrogen peroxide. In the fluid-bed reactor, the catalyst is susceptible to abrasion over time and, thus, fines can be produced which can further complicate the elaborate downstream solids separation devices. Furthermore, the expensive catalyst is underutilized since a portion is maintained inside these elaborate catalyst separation devices instead of directly inside the reactor.

The fluid-bed hydrogenation reactor scheme can take on one of several different types. The reactor can be a stirred-type reactor or achieve its mixing based on the airlift principle (GB Patent 718,307). The fluid bed scheme can alternatively involve tubular reactors (U.S. Pat. No. 4,428,923) in which mixing is achieved by turbulence from high flow velocity. Such tubular reactors can also achieve mixing by adjustments in the tube diameter (U.S. Pat. No. 3,423,176), by premixing the hydrogen and working solution with static mixers (U.S. Pat. No. 4,428,922), or by premixing the reaction mixture and hydrogen with venturi nozzles (U.S. Pat. No. 6,861,042).

The fixed-bed reactors do not abrade the catalyst to the same degree as the fluid bed reactors. Since the catalyst is in a fixed, stationary position within the reactor, the fixed-bed reactors require much simpler, less costly downstream catalyst separation devices. Further, the fixed-bed reactors do not result in back mixing if operated in a co current flow pattern and, thus, are capable, at least in theory, of higher volumetric productivities owing to the near plug flow. However, productivity and selectivity results are often poorer than those obtained with fluid-bed reactors due to uneven flow distribution and/or excessive bed pressure drop. Lastly, fixed-bed reactors normally require stoppage to remove deactivated catalyst unless costly parallel reactor trains are installed.

Another embodiment (U.S. Pat. No. 5,637,286) of a fixed-bed reactor employs foam like mixtures of the working solution and hydrogen with the aim of increasing the productivity. The reported productivity is 172 kg $H_2O_2/(h\text{-}m^3)$ where $m^3$ is the volume of the catalyst bed. However, the flux of the working solution required for this reactor arrangement results in high pressure drop and high energy expenditure. Further, the catalyst is more susceptible to abrasion due to the high work solution flux.

Fixed-bed reactors employing monolithic catalyst beds (U.S. Pat. No. 4,552,748 and No. 5,063,043), commonly called honeycomb structure, seek to overcome some of the disadvantages of the previous fixed-bed reactors by ensuring uniform contact time, lower pressure drop, high selectivity, and efficient palladium utilization. In a honeycomb structure reactor (U.S. Pat. No. 5,063,043), the reported yield is 133 kg $H_2O_2/(h\text{-}m^3)$ where $m^3$ is the volume unit of the reactor structure. However, even distribution of the liquid is problematic and these honeycomb structured catalyst elements require a complicated production technique, as is discussed in U.S. Pat. No. 5,637,286.

All of AO process hydrogenation reactors have the disadvantage in safety in that they contain large reactant inventories. A key safety concern in the AO process is preventing sufficiently high levels of unextracted hydrogen peroxide exiting the extraction stage from entering the hydrogenation stage, upon recycle of the working solution. All unextracted hydrogen peroxide entering the hydrogenation stage is a source of oxygen, and explosive hydrogen/oxygen mixtures can result if unextracted hydrogen peroxide levels are not properly controlled. Because all AO process hydrogenation reactors employ large reactant inventories, the consequences of a hydrogen/oxygen explosion in the hydrogenation reaction can be very severe.

A very different approach for avoiding the drawbacks associated with hydrogenation reactions in large-scale AO processes is the direct synthesis of hydrogen peroxide from reaction of hydrogen and oxygen, which eliminates the separate hydrogenation and oxidation steps. One such direct synthesis process is described in U.S. Pat. No. 7,029,647, in which the staged reaction of the hydrogen and oxygen reactants is carried out in a microchannel reactor.

It is a principal object of this invention to provide an improved method for the hydrogenation stage of a conventional AO process for producing hydrogen peroxide while maintaining the advantages of a fixed bed hydrogenation reactor over a fluid bed reactor and maintaining high productivity and selectivity, high hydrogen utilization per pass, and high-grade waste heat of reaction. Another object of this invention is to provide a safer process for the hydrogenation stage by employing reduced reactant inventories over the conventional AO hydrogenation reactors.

The present invention achieves these and other objectives in the auto-oxidation production of hydrogen peroxide, using a hydrogenation stage carried out in a microreactor.

SUMMARY OF THE INVENTION

In accordance with the present invention, hydrogen peroxide is produced in an auto-oxidation method by effecting hydrogenation of a working compound in a microreactor containing a hydrogenation catalyst. The hydrogenation microreactor preferably contains one or more microchannels, in which the hydrogenation is carried out, with the microchannel having at least one cross sectional dimension within the range of from 1 micron to 5 mm, more preferably, from 5 microns to 1 mm. The hydrogenation catalyst is present in at least a portion of at least one microreactor microchannel and is preferable a transition metal hydrogenation catalyst.

A preferred embodiment of the invention is a cyclic method for the production of hydrogen peroxide comprising hydrogenating a working compound in a microreactor containing a hydrogenation catalyst, oxidizing the hydrogenated working compound to produce hydrogen peroxide, recovering the hydrogen peroxide and recycling the oxidized working compound.

Another preferred embodiment of the invention is a cyclic method for producing hydrogen peroxide in which the working compound is introduced into a hydrogenation microreactor containing a hydrogenation catalyst; a hydrogen source is introduced into the microreactor to catalytically hydrogenate the working compound; the hydrogenated working compound is removed from the hydrogenation microreactor and oxidized to produce hydrogen peroxide; the resulting hydrogen peroxide is separated from the oxidized working compound and recovered as aqueous hydrogen peroxide; and the oxidized working compound is recycled to the hydrogenation microreactor.

Still another preferred embodiment of the invention is a cyclic method for the production of hydrogen peroxide by the steps of catalytically hydrogenating an anthraquinone working solution, comprising an anthraquinone derivative carried in an organic solvent, in a hydrogenation microreactor containing a transition metal hydrogenation catalyst, to yield an a hydrogenated working solution; oxidizing the hydrogenated working solution with air or an oxygen-containing gas, to produce hydrogen peroxide; separating the hydrogen peroxide from the oxidized working solution via aqueous extraction and recovering an aqueous solution of hydrogen peroxide; and recycling the oxidized working solution to the hydrogenation step.

DESCRIPTION OF THE PREFERRED EMBODIMENTS

The present invention is directed to a hydrogenation process step carried out in a microreactor, in the auto-oxidation production of hydrogen peroxide. The hydrogenation microreactor possesses a high surface-to-volume ratio and exhibits enhanced mass transfer and heat transfer rates, all of which provide unexpected efficiencies and advantages to the overall hydrogen peroxide process.

The invention is particularly adapted to the cyclic auto-oxidation production of hydrogen peroxide, in which a suitable organic working compound is catalytically hydrogenated in a microreactor. The hydrogenated working solution withdrawn from the microreactor is thereafter auto-oxidized to yield hydrogen peroxide. The hydrogen peroxide product is recovered from the working solution, preferably by water extraction, and the regenerated working solution is recycled to the hydrogenation step.

The hydrogenation method of this invention, utilizing a microreactor, can be employed with working compounds conventionally used in large-scale hydrogenation reactions in known auto-oxidation (AO) processes. The hydrogenation microreactor is suitable for hydrogenating alkyl anthraquinones and/or alkyl hydroanthraquinones to their corresponding alkyl anthrahydroquinones and/or alkyl hydroanthrahydroquinones. Furthermore, the microreactor is suitable for hydrogenating two or more different anthraquinones and their corresponding ring hydrogenated derivatives to their corresponding anthrahydroquinones. The hydrogenated anthrahydroquinones may then be auto-oxidized to yield the desired hydrogen peroxide product.

Advantages of the Invention

The present invention, utilizing a hydrogenation step carried out in a microreactor, provides higher volumetric productivity than conventional AO hydrogenation reactors. It is believed that the small channel dimensions in a microreactor permit very high surface-to-volume ratios, greatly enhancing mass transfer due to rapid diffusive mixing at the molecular scale. Further, the very high surface-to-volume ratio appears to create a very large surface area for catalyst deposition, relative to the available volume, and thus provide high catalyst utilization due to very short diffusion paths.

Another advantage of the present invention is high selectivity of the hydrogenation reaction, obtained through the hydrogenation reaction taking place in a microreactor. High selectivity is advantageous since the desired hydrogenation reaction product predominates, with side reactions and undesirable byproduct formation being minimized. It is believed that the intense diffusive mixing in a microreactor provides good contact among the three reacting phases in the catalytic hydrogenation reaction and, thus, high selectivity is obtained. The short reactant contact time on the catalyst surface and short residence time inside the microreactor minimize parasitic byproduct formation. Another advantage is that the excellent mixing and very short residence time in a microreactor permit much higher temperature operation, to provide enhanced hydrogenation reaction rate without significant sacrifice in selectivity.

The hydrogenation microreactor of the present invention provides very high volumetric reactor productivity and is significantly improved over conventional AO hydrogenation reactors.

As a result, hydrogenation operating conditions such as temperature, pressure, and metal catalyst concentration can be optimized to obtain high reaction product selectivity, while still maintaining reaction yields higher than those typically obtained in conventional AO hydrogenation reactors.

The microreactor internal surface allows for the optimum catalyst deposition techniques that enhance reactant selectivity. Uniform metal catalyst distribution and deposition on the microreactor walls can be employed, as an alternative to coating of the catalyst on a porous substrate, to avoid metal agglomeration common on porous substrates, e.g., alumina or silica-alumina. Further, optimum phase and pore diameter catalyst properties can be achieved for the hydrogenation catalyst employed in a microreactor. These enhanced properties reduce sub-optimal contact or residence time between the anthraquinone reactant molecule or anthrahydroquinone molecule (or other reactive compound employed) and catalyst surface and also serve to minimize the amount of expensive metal catalyst required.

Another advantage of the method of this invention is that the reactant hydrogen gas can be used to near extinction in the hydrogenation reaction. The hydrogen utilization per pass is advantageously maintained at near 100%, which serves to reduce parasitic by-product formation in the hydrogenation reaction. As a result of such hydrogen gas utilization efficiencies in the hydrogenation microreactor of this invention, the need for hydrogen recycle devices, e.g., expensive compressors, is eliminated.

Another advantage of the invention is the capability of removing the heat of reaction throughout the duration of the reaction, permitting near isothermal operation despite use of a plug-flow style reactor. Isothermal operation affords precise reaction control that enhances reaction selectivity and allows for higher depth of hydrogenation.

Hydrogenation in a microreactor permits precise temperature control, so much higher operating temperatures can be employed while still maintaining good selectivity. Higher hydrogenation operating temperatures increase the utility of the waste heat generated by the exothermic heat of reaction. The high temperature hydrogenation made possible in this invention permits the waste heat to be reused in other unit operations of a conventional AO process such as distillation. By contrast, the heat of reaction in conventional AO hydrogenation reactions typically is lost to the atmosphere via utility cooling systems.

The hydrogenation microreactor of this invention is inherently much safer than a conventional AO hydrogenation reactor, owing to the very small reactant inventory and short path lengths of the microreactor. The enhanced productivity and smaller reactor scale afforded by this invention minimize the likelihood and consequent severity of a hydrogen/oxygen explosion. Another advantage of the smaller scale and greater efficiency of the hydrogenation microreactor is that the inventory of expensive working solution and catalyst in the reactor is minimized.

The microreactor hydrogenation of this invention preserves the advantages of conventional AO fixed bed hydrogenation reactors but without sacrifice in activity or selectivity. The hydrogenation operation of this invention, carried out using a microreactor, is not dependent on a specific composition for the working solution and/or on narrowly defined hydrogenation operating temperatures or pressures.

The hydrogen peroxide auto-oxidation method of the present invention, with a catalytic hydrogenation step carried out using a microreactor, is distinct from other hydrogen peroxide processes that produce hydrogen peroxide directly from hydrogen and oxygen, in a single step. The present invention, as is evident from the description in the present specification, does not encompass such direct methods for the single step synthesis of hydrogen peroxide.

The hydrogenation method of the present invention has the advantage providing a means for effecting significant economic and process efficiencies in existing hydrogen peroxide production technologies, since the method of the present invention may readily be incorporated or adapted into large-volume commercial production plants, as well as enabling the economic production of smaller hydrogen peroxide volumes, e.g., using existing anthraquinone technology.

Hydrogenation Microreactor

The hydrogenation microreactor of this invention is characterized by having one or more microchannels that provide a flow path for the working compound (typically in a working solution) that is catalytically reduced with hydrogen within the microreactor. Preferred embodiments of the hydrogenation microreactor have the hydrogenation catalyst present in the microchannels or on the wall surfaces of the microchannels.

Suitable microreactors employ single or, preferably, multiple flow paths, i.e., microchannels, with at least one dimension limited to from 1 to 2,000 microns. The microchannels are normally longitudinal in arrangement; a microreactor may contain one or multiple microchannels, as many as 10,000 microchannels. The microchannels may be linked, e.g., in series or in parallel or in other configurations or combinations.

The microreactor contains at least one inlet, as an entrance for the joint or separate introduction of the working compound and hydrogenation agent into the microreactor microchannels, and at least one exit, for withdrawal of the hydrogenated working compound. The microchannel configurations, e.g., multiple parallel microchannels within the microreactor, can be linked to one or more entrances and/or exits via manifold or header channels. The hydrogenation agent may be introduced into the hydrogenation microreactor in admixture with the introduced working compound or separately, via a separate inlet that connects directly or indirectly with one or microchannels carrying the introduced working compound.

In addition, the microchannel reactor may contain other microchannel process control aspects besides entrance(s) and exit(s), such as valves, mixing means, separation means, flow re-redirection conduit lines, that are in or a part of the microchannel system. The microreactor may also contain heat exchange and heat flux control means, such as heat exchange conduits, chambers or microchannels, for the controlled removal or introduction of heat to or from the solution or fluid flowing through the microchannel network. The microreactor may also contain process control elements, such as pressure, temperature and flow sensors or control elements.

The microchannel cross section may be any of a variety of geometric configurations or shapes. The microchannel cross section may be rectangular, square, trapezoidal, circular, semi-circular, ellipsoidal, triangular, or the like. In addition, the microchannel may contain wall extensions or inserts that modify the cross-sectional shape, e.g., fins, etc. The shape and/or size of the microchannel cross section may vary over its length. For example, the height or width may taper from a relatively large dimension to a relatively small dimension, or vice versa, over a portion or all of the length of the microchannel.

The hydrogenation microreactor may employ single or, preferably multiple, flow path microchannels with at least one cross sectional dimension within the range of from 1 micron to 5 mm, preferably 5 microns to 2 mm, and most preferably 5 microns to 1 mm. Preferably, the diameter or largest cross sectional microchannel dimension (height or width or other analogous dimension in the case of non-circular cross-sectioned microchannels) is not larger than 2000 microns and, more preferably, is within the range of 10 to 500 microns.

It should be recognized that the microchannel network may have microchannels whose dimensions vary within these ranges and that these preferred dimensions are applicable to the sections of the microreactor where the hydrogenation reaction is carried out.

Fluid flow through the microchannels is generally in a longitudinal direction, approximately perpendicular to the cross-sectional microchannel dimensions referred to above. The longitudinal dimension for the microchannel is typically within the range of about 3 cm to about 10 meters, preferably about 5 cm to about 5 meters, and more preferably about 10 cm to about 3 meters in length.

The selection of microchannel dimensions and overall length is normally based on the residence time desired for the working solution in the hydrogenation microreactor and on the contact time desired for multiphase system, the (liquid) working compound (in the working solution) and (gaseous) hydrogenation agent, in the presence of the (solid) hydrogenation catalyst. The microchannels in the microreactor may also include inert packing, e.g., glass beads or the like in sections of the microreactor not occupied by hydrogenation catalyst, to improve the mixing and mass transfer between the gas phase component(s), e.g., hydrogenation agent, and liquid phase component(s), e.g., working compound, introduced into the microreactor.

Operating conditions, e.g., temperature and pressure, within the hydrogenation microreactor are generally within the ranges normally established for large-scale hydrogenation reactions carried out in AO hydrogen peroxide methods. The enhanced process efficiencies, and improved mass and heat transfer achievable with the method of the present invention permit higher than usual operating temperatures and lower than usual operating pressures to be used without compromise in the overall process efficiency.

Hydrogenation operating temperatures in the microreactor process of this invention may be within the range of about 20° C. to about 100° C., preferably within the range of about 30° C. to about 90° C. Excellent temperature control is achieved in the hydrogenation microreactor of this invention, and near isothermal operation is feasible. Such temperature control is normally achieved via heat exchange channels (which may be microchannels) located adjacent to the microreactor microchannels, through which heat exchange channels a heat exchange fluid is flowed.

Operating pressures for the hydrogenation microreactor, generally measured as the exit pressure, are typically in the low to moderate range, high pressure operation being unnecessary and not warranted from an economic standpoint. Operating pressures are normally less than about 500 psig and preferably less than about 300 psig. Operating pressures below about 150 psig are also feasible, to as low as about 5 psig, with operating pressures in the range of about 50 psig to about 100 psig giving good results.

The working compound is reacted (reduced) with hydrogen gas (or other $H_2$-containing source) in the hydrogenation reactor, and equimolar amounts of each are required for stoichiometric hydrogenation of the working compound, in the case of anthraquinone derivatives. Consequently, the two reactants are preferably introduced into the microreactor in approximately equimolar amounts. However, the actual reactant ratios can be varied widely on either side of equimolar amounts, e.g., the molar ratio of $H_2$ to anthraquinone working compound could range from about 0.5:1 to about 5:1, more preferably being within the range of about 0.8:1 to about 2:1. The hydrogen gas reactant is preferably introduced as relatively pure $H_2$, to promote overall efficiency of the hydrogenation reaction in the microreactor, but gas mixtures containing a major proportion of $H_2$ are also feasible for use in the process of this invention.

The hydrogenation microreactor can be fabricated or constructed from a variety of materials, using any of many known techniques adapted for working with such materials. The hydrogenation microreactor may be fabricated from any material that provides the strength, dimensional stability, inertness and heat transfer characteristics that permit hydrogenation of the working compound to be carried out as described in this specification. Such materials may include metals, e.g., aluminum, steel (e.g., stainless steel, carbon steel, and the like), monel, inconel, titanium, nickel, platinum, rhodium, copper, chromium, brass, and their alloys; polymers (e.g., thermoset resins and other plastics) and polymer composites (e.g., thermoset resins and fiberglass); ceramics; glass; fiberglass; quartz; silicon; graphite; or combinations of these. It should be recognized that fabrication of the microreactor from suitable catalyst metals, e.g., platinum group metals, may also facilitate catalytic reaction of the hydrogenation reaction in the microreactor.

The hydrogenation microreactor may be fabricated using known techniques including wire electrodischarge machining, conventional machining, laser cutting, photochemical machining, electrochemical machining, molding, casting, water jet, stamping, etching (e.g., chemical, photochemical or plasma etching) and combinations thereof. Fabrication techniques used for construction of the microreactor are not limited to any specific methods, but can take advantage of construction techniques known to be useful for construction of a device containing small dimension internal channels or passageways, i.e., microchannels. For example, microelectronics technology applicable for creation of microelectronic circuit pathways is applicable where silicon or similar materials are used for construction of the microreactor. Metal sheet embossing, etching, stamping or similar technology is also useful for fabrication of a microreactor from metallic or non-metallic sheet stock, e.g., aluminum or stainless steel sheet stock. Casting technology is likewise feasible for forming the component elements of a microreactor.

The microreactor may be constructed from individual elements that are assembled to form the desired microreactor configuration with an internal individual microchannel or interconnected microchannel network. The microreactor may be fabricated by forming layers or sheets with portions removed that create microchannels in the finished integral microreactor that allow flow passage to effect the desired hydrogenation of the working compound. A stack of such sheets may be assembled via diffusion bonding, laser welding, diffusion brazing, and similar methods to form an integrated microreactor device. Stacks of sheets may be clamped together with or without gaskets to form an integral microreactor device. The microreactor may be assembled from individual micromachined sheets, containing microchannels, stacked one on top of another in parallel or perpendicular to one another to achieve the microreactor microchannel configuration desired to achieve the sought-after production capacity. Individual plates or sheets comprising the stack may contain as few as 1, 2 or 5 microchannels to as many as 10,000.

Preferred microreactor structures employ a sandwich-like arrangement containing a multiple number of layers, e.g., plates or sheets, in which the microchannel-containing various layers can function in the same or different unit operations. The unit operation of the layers can vary from reaction, to heat exchange, to mixing, to separation or the like.

The disclosures of U.S. Pat. No. 7,029,647 of Tonkovich et al. that relate to microchannel devices are hereby incorporated by reference into the present specification, as examples of microchannel devices that could be adapted for use in the hydrogenation method of the present invention. The disclosures of U.S. Pat. No. 6,968,892 of Symonds, of U.S. Pat. No. 6,736,201 of Watton et al. and of U.S. Pat. No. 6,695,044 of Symonds are hereby incorporated by reference into the present specification, for their descriptions of reactors and heat exchanger devices that could be fabricated with microchannels to create a microreactor device that could be adapted for use in the hydrogenation method of the present invention.

Hydrogenation Catalyst

The hydrogenation step carried out within the microreactor is facilitated with the presence of a suitable hydrogenation catalyst, to effect the efficient reduction of the working compound with the reducing agent, $H_2$. The hydrogenation catalyst is preferably contained within the microreactor microchannels, and may be present in any of several different forms and maintained within the microchannels by any of several different means.

The hydrogenation method of the present invention can be carried out using any material capable of catalyzing hydrogenation (reduction) reaction using a suitable working compound. Suitable catalysts include hydrogenation catalysts used in conventional macro-scale hydrogenation steps in known AO hydrogen peroxide manufacturing methods. The hydrogenation catalyst should be active, selective, stable, and have a long life.

Suitable catalysts for the hydrogenation step of this invention include transition metal catalysts such as palladium, palladium black, platinum, rhodium, and Raney nickel, as solid metals or their oxides or, alternatively, supported on a solid support material. Preferred catalysts include the platinum group metals, i.e., palladium, platinum, ruthenium, rhodium, iridium and osmium. Palladium (Pd) is especially preferred for use as the hydrogenation catalyst in this invention.

The catalyst may be incorporated into the hydrogenation microreactor using any of several techniques. The catalyst may be deposited, dispersed or coated onto the internal wall surface of the microreactor, in specific portions or segments of the microreactor channel(s) or throughout the microreactor interior, using known deposition techniques, e.g., electrodeposition, washcoating, solution plating, or the like.

The catalyst may also or alternatively be deposited, dispersed or coated onto a lattice, matrix or other support housed within the microreactor interior. For example, the preferred palladium (or other transition metal catalyst) may be used in the microreactor as palladium black or in fabricated form, e.g., a thin film coating, wire mesh or gauze, engineered insert, supported on a carrier or the like.

The catalyst used in the hydrogenation microreactor may have any size and geometric configuration that fits within the microchannels. The catalyst may be in the form of particulate solids (e.g., tiny pellets, powder, fibers, and the like) having a median particle diameter of about 1 to about 1000 microns, preferably having a median particle diameter of about 10 to about 500 microns. The hydrogenation catalyst may be incorporated into the microchannels of the microreactor in the form of a fixed bed of particulate solids. The hydrogenation catalyst may be in the form of a single piece of porous contiguous material, or many pieces in physical contact.

The hydrogenation catalyst may also or alternatively be deposited, dispersed or coated onto conventional catalyst substrate support media that is incorporated or otherwise introduced into the microreactor channel(s). Such support media may include known support materials such as alumina, silica, aluminosilicates (silica-alumina), activated magnesia, titanium dioxide, carbon black, activated carbon, zeolites, ion exchange resins, polymer substrates, metal substrates, e.g., sintered stainless steel fiber or nickel sponge, an alkaline earth metal carbonate, e.g., dolomite, or the like or combinations of these. The percentage concentration of the metal in the supported catalysts can range from about 0.1 to greater than 50 wt % but preferably is in the range of about 0.2 wt % to about 5 wt %.

The hydrogenation catalyst may also be supported on a porous support structure such as a foam, felt, wad or a combination of these or supported on a flow-through support structure such as a foam, wad, pellet, powder, or gauze. The catalyst may also be supported on an assembly of one or more fins positioned within the microreactor microchannels. The catalyst can be supported on a flow-by support structure such as a felt with an adjacent gap, a foam with an adjacent gap, a fin structure with gaps, a washcoat on any inserted substrate, or a gauze that is parallel to the flow direction with a corresponding gap for flow. The support structure may be made of a heat-conducting material, such as a metal, to enhance heat transfer to or from the catalyst.

The metal catalyst may be used alone or in combination with other catalyst metals or synergistic metals. A platinum group metal used as the hydrogenation catalyst, palladium being preferred, may also contain at least one additional metal selected from the group consisting of iron, chromium, nickel, titanium, zirconium, aluminum, cerium, lanthanum, manganese, and cobalt.

Additionally, supported metal catalysts that employ at least one other metal such as silver, copper, germanium, tin, iron, tellurium, nickel or mixtures of these, in which the second metal is deposited on a support, e.g., alumina, silica or aluminosilicates, may be used in this invention. Supported transition metal phase-controlled catalysts are also suitable catalysts for use in the hydrogenation step of this invention.

The metal catalyst may also be carried on a support, as described above, but with an intermediate interfacial or buffer layer applied to the substrate and the catalyst metal then overlying the intermediate interfacial or buffer layer.

In another embodiment of this invention, the hydrogenation catalyst, in finely-divided form, may be slurried in the working solution and passed through the microreactor with the working solution. After the hydrogenated working solution exits from the microreactor, the catalyst solids suspended in the working solution are separated from the solution before the working solution is subjected to auto-oxidation.

Anthraquinone Derivative—Working Compound & Working Solution

The hydrogen peroxide method of this invention may employ any of various known "working compounds" (i.e., "reactive compounds") and "working solutions" containing such working compounds, useful in the preparation of hydrogen peroxide via hydrogenation and subsequent auto-oxidation of the working compound.

The working compound is preferably an anthraquinone derivative. The anthraquinone derivative used as the working compound in the method of this invention is not critical and any of the known prior art anthraquinone derivatives may be used. Alkyl anthraquinone derivatives and alkyl hydroanthraquinone derivatives are preferred.

Alkyl anthraquinone derivatives suitable for use as the working compound in this invention include alkyl anthraquinones substituted in position 1, 2, 3, 6 or 7 and their corresponding alkyl hydroanthraquinones, wherein the alkyl group is linear or branched and preferably has from 1 to 8 carbon atoms. The alkyl group is preferably located on a position that is not immediately adjacent to the quinone ring, i.e., the 2-, 3-, 6-, or 7-position.

The method of the present invention is applicable, but not limited to, the following anthraquinone derivatives: 2-amylanthraquinone, 2-methylanthraquinone, 2-ethylanthraquinone, 2-propyl- and 2-isopropylanthraquinones, 2-butyl-, 2-sec.butyl-, 2-tert.butyl-, 2-isobuytl-anthraquinones, 2-sec.amyl- and 2-tert.amylanthraquinones, 1,3-diethyl anthraquinone, 1,3-, 2,3-, 1,4-, and 2,7-dimethylanthraquinone, 1,4-dimethyl anthraquinone, 2,7-dimethyl anthraquinone, 2 pentyl-, 2-isoamyanthraquinone, 2-(4-methyl-3-pentenyl) and 2-(4-methylpentyl) anthraquinone, 2-sec.amyl- and 2 tert.amyl-anthraquinones, or combinations of the above mentioned anthraquinones, as well as their corresponding hydroanthraquinone derivatives.

The anthraquinone derivative employed as the working compound is preferably chosen from 2-alkyl-9,10-anthraquinones in which the alkyl substituent contains from 1 to 5 carbon atoms, such as methyl, ethyl, sec-butyl, tert-butyl, tert-amyl and isoamyl radicals, and the corresponding 5,6,7,8-tetrahydro derivatives, or from 9,10-dialkylanthraquinones in which the alkyl substituents, which are identical or different, contain from 1 to 5 carbon atoms, such as methyl, ethyl and tert-butyl radicals, e.g., 1,3-dimethyl, 1,4-dimethyl, 2,7-dimethyl, 1,3-diethyl, 2,7-di(tert-butyl), 2-ethyl-6-(tert-butyl) and the corresponding 5,6,7,8-tetrahydro derivatives.

Particularly preferred alkylanthraquinones are 2-ethyl, 2-amyl and 2-tert.butyl anthraquinones, used individually or in combinations.

The "working compound" (reactive compound), e.g., anthraquinone derivatives being preferred, is preferably used in conjunction with a solvent or solvent mixture, the working compound and solvent(s) comprising a "work solution".

It should be understood, however, that work solutions containing only a working compound, e.g., anthraquinone derivatives, are within the scope of the present invention. A solvent for the working compound(s) is preferred in the case of anthraquinone derivative working compounds but not essential for carrying out the hydrogenation reaction in the microreactor of this invention.

The solvent or solvent mixture used in the working solution preferably has a high partition coefficient for hydrogen peroxide with water, so that hydrogen peroxide can be efficiently extracted. Preferred solvents are chemically stable to the process conditions, insoluble or nearly insoluble in water, and a good solvent for the anthraquinone derivative, e.g., alkylanthraquinone, or other working compound employed, in both their oxidized and reduced forms. For safety reasons, the solvent preferably should have a high flash point, low volatility, and be nontoxic.

Mixed solvents may be used and are preferred for enhancing the solubility of the (anthraquinone) working compound in both its hydrogenated (reduced) form (i.e., the hydroquinone form) and its oxidized (neutral) form (i.e., the quinone form.) The organic solvent mixture, forming part of the working solution, is preferably a mixture of a nonpolar compound and of a polar compound.

Since polar solvents tend to be relatively soluble in water, the polar solvent is desirably used sparingly so that water extraction of the oxidized working solution does not result in contamination of the aqueous hydrogen peroxide product in the aqueous extract. Nevertheless, sufficient polar solvent must be used to permit the desired concentration of the anthrahydroquinone to be present in the working solution's organic phase. The maintenance of a proper balance between these two criticalities is important in peroxide manufacture but is well known to those skilled in the art.

Solvent mixtures generally contain one solvent component, often a non-polar solvent, in which the anthraquinone derivative is highly soluble, e.g., $C_8$ to $C_{17}$ ketones, anisole, benzene, xylene, trimethylbenzene, methylnaphthalene and the like, and a second solvent component, often a polar solvent, in which the anthrahydroquinone derivative is highly soluble, e.g., $C_5$ to $C_{12}$ alcohols, such as diisobutylcarbinol and heptyl alcohol, methylcyclohexanol acetate, phosphoric acid esters, such as trioctyl phosphate, and tetra-substituted or alkylated ureas.

As noted earlier, the inert solvent system typically comprises a suitable anthraquinone and anthrahydroquinone solvent.

The solvent or solvent component for the anthraquinone derivative, e.g., alkylanthraquinone, is preferably a water-immiscible solvent. Such solvents include aromatic crude oil distillates having boiling points within the range of range of from 100° C. to 250° C., preferably with boiling points more than 140° C. Examples of suitable anthraquinone solvents are aromatic $C_9$-$C_{11}$ hydrocarbon solvents that are commercial crude oil distillates, such as Shellsol (Shell Chemical LP, Houston, Tex., USA), SureSol™ 150ND (Flint Hills Resources, Corpus Christi, Tex., USA), Aromatic 150 Fluid or Solvesso™ (ExxonMobil Chemical Co., Houston Tex., USA), durene (1,2,4,5-tetramethylbenzene), and isodurene (1,2,3,5-tetramethylbenzene).

Examples of suitable anthrahydroquinone solvents include alkylated ureas, e.g., tetrabutylurea, cyclic urea derivatives, and organic phosphates, e.g., 2-ethylhexyl phosphate, tributyl phosphate, and trioctyl phosphate. In addition, suitable anthrahydroquinone solvents include carboxylic acid esters, e.g., 2-methyl cyclohexyl acetate (marketed under the name Sextate), and $C_4$-$C_{12}$ alcohols, e.g., including aliphatic alcohols such as 2-ethylhexanol and diisobutyl carbinol, and cyclic amides and alkyl carbamates.

Alternatively, where all quinone systems are employed or other non-anthraquinone based auto-oxidation systems are employed in the method of this invention, the working compound may be employed without the use of a solvent.

Non-Anthraquinone Systems

The microreactor-based hydrogenation of the present invention is applicable to auto-oxidation production of hydrogen peroxide using working compounds other than anthraquinones. The catalytic hydrogenation in a microreactor may be carried out using non-anthraquinone working compounds conventionally used in large-scale hydrogenation and auto-oxidation production of hydrogen peroxide.

One example of such working compounds is azobenzene (and its derivatives), which can be used in a cyclic auto-oxidation process in which hydrazobenzene (1,2-diphenylhydrazine) is oxidized with oxygen to yield azobenzene(phenyldiazenylbenzene) and hydrogen peroxide, the azobenzene then being reduced with hydrogen to regenerate the hydrazobenzene. U.S. Pat. No. 2,035,101 discloses an improvement in the azobenzene hydrogen peroxide process, using amino-substituted aromatic hydrazo compounds, e.g., amino-substituted benzene, toluene, xylene or naphthalene.

Another example of such working compounds is phenazine (and its alpha-alkylated derivatives, e.g., methyl-1-phenazine), which also can be used in a cyclic auto-oxidation process in which dihydrophenazine is oxidized with oxygen to yield phenazine and hydrogen peroxide, the phenazine then being reduced, e.g., with hydrogen, to regenerate the dihydrophenazine. A phenazine hydrogen peroxide process is disclosed in U.S. Pat. No. 2,862,794.

Oxidation and Regeneration of Hydrogenated Working Solution;

Hydrogen Peroxide Recovery

The hydrogenated working solution that is removed from the hydrogenation microreactor is next subjected to oxidation, with air, pure oxygen, other oxygen-containing gas or other oxygen-containing source, to produce the desired product, hydrogen peroxide. The oxidation step is normally carried out as an auto-oxidation, without a catalyst. The method of this invention does not preclude the use of a catalyst during oxidation to facilitate the reaction, but such a catalyst is merely optional. Auto-oxidation without a catalyst is preferred.

Suitable optional oxidation catalysts include those catalysts used in conventional large-scale oxidation steps in known AO hydrogen peroxide manufacturing methods. Such oxidation catalysts, unlike metal solid or supported metal hydrogenation catalysts, are normally dissolved or otherwise incorporated into the working solution, along with the working compound. The optional oxidation catalysts are preferably dissolved in the solvent-based working solution. Examples of the optional oxidation catalysts include secondary or tertiary amines or an alkaline-reacting, ionizable water-soluble inorganic compound such as alkali metal hydroxides, alkaline earth hydroxides, sodium carbonate, sodium hydroxide and ammonium hydroxide.

The oxidation step may be carried out in chemical processing equipment conventionally used for the oxidation or auto-oxidation of hydrogenated working solutions. The oxidizing agent may be air, oxygen-enriched gas or oxygen gas and is preferably air for economic reasons.

The working compound, having been catalytically reduced in the hydrogenation step, is reformed or regenerated in the oxidation step. In other words, an anthraquinone working compound, reduced to the corresponding anthrahydroquinone during hydrogenation, is converted back to the original anthraquinone in the auto-oxidation step. The reformed working compound may then be recycled back to the hydrogenation step, for reuse, after recovery of the hydrogen peroxide product.

The resulting hydrogen peroxide produced in the oxidation step is extracted with water from the working solution from the oxidation step, using conventional extraction techniques and equipment well-known to those skilled in the art. Other hydrogen peroxide recovery techniques are also possible, for separating the hydrogen peroxide from the working solution but water extraction is preferred.

The recovered hydrogen peroxide product, in the aqueous extract, may be concentrated, as desired, using concentration techniques and equipment conventionally used in the production of concentrated forms of hydrogen peroxide. In addition, various stabilizers may be added to the recovered product, to minimize hydrogen peroxide decomposition, s is well known in the art.

The working compound, e.g., anthraquinone derivative, that is regenerated during the oxidation step, is recycled to the hydrogenation stage after recovery of the product hydrogen peroxide. The hydrogenation operation is then repeated and carried out on the regenerated working compound as described above.

The following non-limiting Examples illustrate various aspects of the present invention.

EXAMPLES

Experimental Procedure for Examples 1-20

The hydrogen peroxide methods illustrated in these Examples 1-20 employed an auto-oxidation process using various anthraquinone derivative working solutions and operating conditions. The hydrogenation stage of the auto-oxidation hydrogen peroxide process of this invention was carried out in a microreactor.

The hydrogenation microreactor employed in Examples 1-20 was made of stainless steel grade SS316L and had a tubular microchannel with a diameter of 0.775 mm and a linear (straight) longitudinal configuration, 6 cm in length. The hydrogenation microreactor contained a palladium (Pd) catalyst. The microreactor was packed throughout its length with Pd catalyst that was coated onto an aluminosilicate substrate; the supported catalyst contained 2 wt % Pd. The microreactor was packed throughout its length with Pd catalyst and contained about 13 mg of aluminosilicate-supported Pd catalyst.

The hydrogenated work solution effluent exiting from the hydrogenation microreactor outlet was collected, auto-oxidized and subsequently analyzed to determine its equivalent hydrogen peroxide content. Equivalent hydrogen peroxide product recoverable via auto-oxidation of the hydrogenated work solution was determined by titration of the collected hydrogenated work solution effluent with potassium permanganate ($KMnO_4$) after the work solution had been oxygenated with pure oxygen gas.

The working solution for Examples 1-11 was a solvent mixture of aromatic $C_9$-$C_{11}$ hydrocarbon solvent, trioctyl phosphate, and alkylated urea, with the working compounds (reaction carrier) being 2-ethylanthraquinone and 2-ethyltetrahydroanthraquinone.

Examples 12-20 illustrate other anthraquinone derivative working solutions, with various solvents and reactive carriers, as described below.

The reducing agent used for the hydrogenation in the microreactor was compressed pure hydrogen gas that flowed through a mass flow controller. The hydrogen gas stream was then mixed with the working solution in a T fitting and fed to the hydrogenation microreactor inlet.

A constant temperature oil bath was used to maintain the microreactor at the desired temperature. The inlet and outlet pressures of the reactor were also measured. The reaction mixture (hydrogenated work solution) that exited from the microreactor outlet was passed through a backpressure regulator that was used to maintain the desired pressure throughout the run. The hydrogenation reaction mixture was then passed to a product receiver where the hydrogenated working solution was collected and auto-oxidized (i.e., without a catalyst) with pure $O_2$ gas. The oxidized working solution was analyzed for equivalent hydrogen peroxide, by extraction with aqueous 15% $H_2SO_4$ and titration of the extract with a $KMnO_4$ solution to determine the $H_2O_2$ equivalent concentration.

Preparation for a run involved first pumping the working solution through the microreactor system to obtain the desired flow rate. The backpressure regulator was adjusted to obtain the desired reactor outlet pressure. At the start of a run, pure hydrogen gas was then introduced into the work solution, and the mixture was passed through the microreactor system in a controlled manner using the mass flow controller.

Examples 1-11

Examples 1-4 were carried out with the hydrogenation microreactor having a range of work solution effluent pressures, the effluent outlet pressure being 200 psig in Example 1, 100 psig in Example 2, 20 psig in Example 3 and 5 psig in Example 4.

In each of Examples 1-4 the other operating parameters were kept constant: The operating temperature of the hydrogenation microreactor was 70° C. The hydrogen gas ($H_2$) was introduced into the microreactor at a flow rate of 4.0 sccm (standard cubic centimeters per minute), and the work solution was flowed through the microreactor at a rate of 0.4 ml/min., the hydrogen gas and work solution having been first mixed with each other prior to their introduction into the microreactor.

Examples 5 and 6 were operated at a constant work solution effluent pressure of 5 psig (as in Example 4), but the microreactor operating temperatures were lower than the 70° C. used in Example 4. Example 5 was operated at 50° C., and Example 6 was operated at 30° C. Hydrogen gas flow rate and work solution flow rate were maintained constant, at the same values as used in Examples 1-4.

Examples 7-9 were carried out at a constant work solution effluent pressure of 200 psig (as used in Example 1), but the microreactor operating temperatures were different from the 70° C. used in Example 1. Example 7 was operated at 50° C., Example 8 was operated at 60° C., and Example 9 was operated at 80° C. Hydrogen gas flow rate and work solution flow rate were maintained constant, at the same values as used in Examples 1-6.

Examples 10-11 evaluated different hydrogen gas flow rates, higher and lower than the $H_2$ flow rate of 4.0 sccm used in the hydrogenation microreactor of Examples 1-9.

Operating conditions for Examples 10-11 were otherwise the same as those used in Example 1: the hydrogenation microreactor operating temperature was 70° C., work solution effluent pressure of 200 psig; and the work solution flowed through the microreactor at a rate of 0.4 ml/min. Hydrogen gas ($H_2$) was introduced into the microreactor at a flow rate of 2.5 sccm in Example 10 and at 8 sccm in Example 11.

Results and operating parameters for Examples 1-11 are shown in Table 1. The equivalent hydrogen peroxide product, as g $H_2O_2$/liter (of aqueous extract), was determined for each of the Examples. In addition, reactor productivity, measured as kg $H_2O_2$/hr per cubic meter of reactor volume (based on unpacked microreactor channel volume), and catalyst productivity, measured as kg $H_2O_2$/hr per kilogram of catalyst (based on total supported catalyst weight, not catalyst Pd metal weight), were also determined for each of the Examples.

TABLE 1

| Example No. | Temperature (° C.) | Outlet Pressure (psig) | $H_2$ Flow (sccm) | Work Solution Flow (ml/min) | $H_2O_2$ Equivalent (g/L) | Reactor Productivity (kg $H_2O_2$/hr-m³) | Catalyst Productivity (kg $H_2O_2$/hr-kg catalyst) |
|---|---|---|---|---|---|---|---|
| 1 | 70 | 200 | 4.0 | 0.4 | 10.6 | 8297 | 19.6 |
| 2 | 70 | 100 | 4.0 | 0.4 | 9.0 | 7086 | 16.7 |

TABLE 1-continued

| Example No. | Temperature (° C.) | Outlet Pressure (psig) | $H_2$ Flow (sccm) | Work Solution Flow (ml/min) | $H_2O_2$ Equivalent (g/L) | Reactor Productivity (kg $H_2O_2$/hr-m$^3$) | Catalyst Productivity (kg $H_2O_2$/hr-kg catalyst) |
|---|---|---|---|---|---|---|---|
| 3 | 70 | 20 | 4.0 | 0.4 | 8.1 | 6380 | 15.0 |
| 4 | 70 | 5 | 4.0 | 0.4 | 8.6 | 6750 | 15.9 |
| 5 | 50 | 5 | 4.0 | 0.4 | 6.4 | 5054 | 11.9 |
| 6 | 30 | 5 | 4.0 | 0.4 | 3.6 | 2835 | 6.7 |
| 7 | 50 | 200 | 4.0 | 0.4 | 9.8 | 7657 | 18.1 |
| 8 | 60 | 200 | 4.0 | 0.4 | 10.4 | 8103 | 19.1 |
| 9 | 80 | 200 | 4.0 | 0.4 | 10.8 | 8593 | 20.3 |
| 10 | 70 | 200 | 2.5 | 0.4 | 7.0 | 5454 | 12.9 |
| 11 | 70 | 200 | 8.0 | 0.4 | 13.0 | 10,176 | 24.0 |

Examples 12-20

Examples 12-20 demonstrate the hydrogenation microreactor used with various conventional anthraquinone derivative working compounds (alkylated anthraquinones) and working solvents, as anthraquinone derivative work solutions, to yield hydrogenated work solutions suitable for subsequent auto-oxidation to produce hydrogen peroxide.

Examples 12-17 and 20 were carried out in the same hydrogenation microreactor that was used in Examples 1-11, under operating conditions identical to those used in Example 2: The operating temperature of the hydrogenation microreactor was 70° C., the hydrogen gas ($H_2$) was introduced into the microreactor at a flow rate of 4.0 sccm, the work solution was flowed through the microreactor at a rate of 0.4 ml/min., and the work solution effluent outlet pressure was 100 psig, in each of the five Examples.

Examples 18 and 19 were also carried out in the same hydrogenation microreactor that was used in Examples 1-11, under operating conditions identical to those used in Example 2, with the hydrogen gas flow rate being introduced at higher flow rates in these two Examples. The hydrogen gas ($H_2$) was introduced into the microreactor at a flow rate of 8.0 sccm in Example 18 and 12.0 sccm in Example 19, in contrast to the 4.0 sccm $H_2$ flow rate used in the prior Examples.

Example 12 used a combination of 2-ethylanthraquinone and 2-ethyltetrahydroanthraquinone as the working compounds, in a solvent mixture containing a non-polar solvent and a polar solvent, respectively, aromatic $C_9$-$C_{11}$ hydrocarbon solvent and methylcyclohexyl acetate.

Example 13 used a three component combination containing 2-ethylanthraquinone, 2-ethyltetrahydroanthraquinone and 2-tertiarybutylanthraquinone as the working compounds, in a solvent mixture containing aromatic $C_9$-$C_{11}$ hydrocarbon solvent and methylcyclohexyl acetate.

Example 14, like Example 13, used the same three component combination containing 2-ethylanthraquinone, 2-ethyltetrahydroanthraquinone and 2-tertiarybutylanthraquinone as the working compounds, but solvent mixture in Example 14 contained aromatic $C_9$-$C_{11}$ hydrocarbon solvent and three polar solvents, methylcyclohexyl acetate, trioctyl phosphate and alkylated urea.

Example 15 used a three component combination containing 2-ethylanthraquinone, 2-ethyltetrahydroanthraquinone and 2-amylanthraquinone as the working compounds, in a solvent mixture containing aromatic $C_9$-$C_{11}$ hydrocarbon solvent, trioctyl phosphate and alkylated urea.

Example 16 used an anthraquinone-derivative work solution that has been described in a prior art hydrogen peroxide production method, in U.S. Pat. No. 2,886,416. The working compound was 2-ethylanthraquinone and the solvent was a mixture of trimethyl benzene (a lower boiling point aromatic solvent that otherwise has similar solvent properties to triethyl benzene, the solvent used in the example of U.S. Pat. No. 2,886,416) and methylcyclohexyl acetate. The work solution contained 42 g/l of 2-ethylanthraquinone, with the solvent being 15:85 vol/vol trialkyl benzene and methylcyclohexyl acetate, as described in U.S. Pat. No. 2,886,416.

Results for Example 16 are shown in Table 2 and demonstrate a significant improvement in hydrogenation efficiency in the microreactor hydrogenation method of this invention, as compared with the conventional macro-scale reactor employed in the method of U.S. Pat. No. 2,886,416. The hydrogenation carried out in Example 16, in the microreactor, yielded a catalyst productivity of 7.55 kg $H_2O_2$/hr-kg catalyst, as compared to 1.41 kg $H_2O_2$/hr-kg catalyst for the '416 method that was calculated based on the disclosures of U.S. Pat. No. 2,886,416, a $H_2O_2$ productivity improvement five times greater than the prior art hydrogenation.

Examples 17, 18 and 19 used a combination of 2-amylanthraquinone and 2-amyltetrahydroanthraquinone as the working compounds, in a solvent mixture containing a non-polar solvent and a polar solvent, respectively, aromatic $C_9$-$C_{11}$ hydrocarbon solvent and 2,6-dimethyl-4-heptanol(diisobutylcarbinol—DIBC). The hydrogen gas flow rate to the microreactor was varied in these three Examples, as noted above.

Example 20 used a two component combination containing 2-ethylanthraquinone and 2-ethyltetrahydroanthraquinone as the working compounds, in a solvent mixture containing aromatic $C_9$-$C_{11}$ hydrocarbon solvent, trioctyl phosphate and alkylated urea.

Results and operating parameters for Examples 12-20 are shown in Table 2.

The equivalent hydrogen peroxide product, as g $H_2O_2$/liter, was determined for each of the Examples. In addition, reactor productivity, measured as kg $H_2O_2$/hr per cubic meter of reactor volume (based on unpacked microreactor channel volume), and catalyst productivity, measured as kg $H_2O_2$/hr per kilogram of catalyst, were also determined for each of the Examples.

TABLE 2

| Example No. | Temperature (° C.) | Outlet Pressure (psig) | $H_2$ Flow (sccm) | Work Solution Flow (ml/min) | $H_2O_2$ Equivalent (g/L) | Reactor Productivity (kg $H_2O_2$/hr-m$^3$) | Catalyst Productivity (kg $H_2O_2$/hr-kg catalyst) |
|---|---|---|---|---|---|---|---|
| 12 | 70 | 100 | 4.0 | 0.4 | 5.9 | 4638 | 10.9 |
| 13 | 70 | 100 | 4.0 | 0.4 | 5.2 | 4080 | 9.6 |
| 14 | 70 | 100 | 4.0 | 0.4 | 6.5 | 5060 | 11.9 |
| 15 | 70 | 100 | 4.0 | 0.4 | 5.5 | 4303 | 10.2 |
| 16 | 70 | 100 | 4.0 | 0.4 | 4.1 | 3201 | 7.6 |
| 17 | 70 | 100 | 4.0 | 0.4 | 5.3 | 4183 | 9.9 |
| 18 | 70 | 100 | 8.0 | 0.4 | 7.2 | 5664 | 13.4 |
| 19 | 70 | 100 | 12.0 | 0.4 | 13.2 | 10292 | 24.3 |
| 20 | 70 | 100 | 4.0 | 0.4 | 8.6 | 6733 | 15.9 |

The reactor productivity demonstrated in the microreactor hydrogenation of Examples 1-20 (see penultimate column in Tables 1 & 2) is greatly improved over reactor productivities reported in the prior art, for conventional catalytic hydrogenation reactor operations. U.S. Pat. No. 5,637,286 describes a hydrogenation reactor in Examples 1-3 that provided reactor productivity yields ranging from 142-172 kg $H_2O_2$/hr-m$^3$. U.S. Pat. No. 5,063,043 (EP 0384905) discloses reactor productivity for its inventive reactor and prior art reactors, in Examples 2 & 3 (Tables II & III), ranging from 64-133 kg $H_2O_2$/hr-m$^3$.

By contrast, Examples 1-20 illustrating the hydrogenation microreactor of the present invention yielded far superior reactor productivity yields, ranging from 2835-10,292 kg $H_2O_2$/hr-m$^3$ (see Tables 1 and 2, penultimate column).

It will be appreciated by those skilled in the art that changes could be made to the embodiments described above without departing from the broad inventive concept thereof. It is understood, therefore, that this invention is not limited to the particular embodiments disclosed but is intended to cover modifications within the spirit and scope of the present invention as defined by the appended claims.

What is claimed is:

1. An auto-oxidation method for the production of hydrogen peroxide comprising effecting hydrogenation of a working compound in a microreactor containing a hydrogenation catalyst on a catalyst support within at least a portion of at least one microchannel in the microreactor, the microreactor being constructed of a material selected from the group consisting of metals, polymers, polymer composites, and combinations of these, and, further, the catalyst support being a support medium contained within a microreactor microchannel or being a removable wall surface portion on which the catalyst is coated or otherwise carried.

2. A cyclic method for the production of hydrogen peroxide comprising hydrogenating a working compound in a microreactor containing a hydrogenation catalyst on a catalyst support within at least a portion of at least one microchannel in the microreactor, oxidizing the hydrogenated working compound to produce hydrogen peroxide, recovering the hydrogen peroxide and recycling the oxidized working compound, the microreactor being constructed of a material selected from the group consisting of metals, polymers, polymer composites, and combinations of these, and, further, the catalyst support being a support medium contained within a microreactor microchannel or being a removable wall surface portion on which the catalyst is coated or otherwise carried.

3. The hydrogen peroxide production method of claim 2 which further comprises a cyclic method in which the working compound is introduced into the hydrogenation microreactor containing a hydrogenation catalyst; a hydrogen source is introduced into the microreactor to catalytically hydrogenate the working compound; the hydrogenated working compound is removed from the hydrogenation microreactor and oxidized to produce hydrogen peroxide; the resulting hydrogen peroxide is separated from the oxidized working compound and recovered as aqueous hydrogen peroxide; and the oxidized working compound is recycled to the hydrogenation microreactor.

4. The method of claim 2 or 3 wherein the working compound is selected from the group consisting of amino-substituted aromatic azo compounds, phenazine, alkylated phenazine derivatives, alkyl anthraquinones, hydroalkyl anthraquinones, and mixtures of alkyl anthraquinones and hydroalkyl anthraquinones.

5. The method of claim 1 or 2 wherein the hydrogenation uses a hydrogen source selected from the group consisting of hydrogen gas and hydrogen-rich gas.

6. The method of claim 1, 2 or 3 wherein the hydrogenation catalyst comprises a transition metal hydrogenation catalyst.

7. The method of claim 6 wherein the transition metal hydrogenation catalyst comprises a transition metal selected from the group consisting of Fe, Co, Ni, Ru, Rh, Pd, Os, Ir and Pt.

8. The method of claim 1, 2 or 3 wherein the microreactor contains one or more microchannels, in which the hydrogenation is carried out.

9. The method of claim 8 wherein the microchannel has at least one cross sectional dimension within the range of from 1 micron to 5 mm.

10. The method of claim 8 wherein the microchannel has at least one cross sectional dimension within the range of from 5 microns to 2 mm.

11. The method of claim 8 wherein the microchannel has at least one cross sectional dimension within the range of from 5 microns to 1 mm.

12. The method of claim 8 wherein the hydrogenation microreactor contains an inlet to one or more linked microchannels and an outlet from such microchannels, for respectively introducing the working compound to the microreactor and removing hydrogenated working compound from the microreactor.

13. The method of claim 8 wherein the microreactor further contain at least one additional passageway adjacent to at least one hydrogenation microchannel for effecting heat transfer and hydrogenation temperature control using a heat transfer fluid during the hydrogenation reaction.

14. The method of claim 8 wherein the microreactor comprises layered sheets that contain an interconnected microchannel network.

15. The method of claim 1, 2 or 3 wherein the working compound is carried in an organic solvent.

16. The method of claim 15 wherein the working compound is selected from the group consisting of alkyl anthraquinones and hydroalkyl anthraquinones and mixtures of alkyl anthraquinones and hydroalkyl anthraquinones and the working compound is carried in a solvent mixture of (i) an aromatic $C_9$-$C_{11}$ hydrocarbon solvent and (ii) a second solvent component selected from the group consisting of alkylated ureas, cyclic urea derivatives, organic phosphates, carboxylic acid esters, $C_4$-$C_{12}$ alcohols, cyclic amides and alkyl carbamates and mixtures thereof.

17. The method of claim 1, 2 or 3 wherein the hydrogenation is carried out at temperatures within the range of about 20° C. to about 100° C.

18. The method of claim 1, 2 or 3 wherein the hydrogenation is carried out at a pressure in the range of about 5 psig to about 300 psig.

19. The method of claim 2 or 3 wherein the hydrogen peroxide is separated from the oxidized working compound by extraction with water, to produce aqueous hydrogen peroxide.

20. A cyclic method for the production of hydrogen peroxide comprising the steps of catalytically hydrogenating an anthraquinone working solution, comprising an anthraquinone derivative carried in an organic solvent, in a hydrogenation microreactor containing a transition metal hydrogenation catalyst on a catalyst support within at least a portion of at least one microchannel in the microreactor, to yield an a hydrogenated working solution; oxidizing the hydrogenated working solution with air or an oxygen-containing gas, to produce hydrogen peroxide; separating the hydrogen peroxide from the oxidized working solution via aqueous extraction and recovering an aqueous solution of hydrogen peroxide; and recycling the oxidized working solution to the hydrogenation step, the microreactor being constructed of a material selected from the group consisting of metals, polymers, polymer composites, and combinations of these, and, further, the catalyst support being a support medium contained within a microreactor microchannel or being a removable wall surface portion on which the catalyst is coated or otherwise carried.

* * * * *